United States Patent [19]

Osman et al.

[11] Patent Number: 4,944,926

[45] Date of Patent: Jul. 31, 1990

[54] METHOD TO TREAT RHODIUM-CONTAINING SOLUTIONS

[75] Inventors: Akhtar Osman, Clearwater; William G. Bradford, Sarnia, both of Canada

[73] Assignee: Polysar Limited, Sarnia, Canada

[21] Appl. No.: 226,883

[22] Filed: Aug. 1, 1988

[51] Int. Cl.$^5$ .................. C01G 55/00; C08C 2/00
[52] U.S. Cl. ...................... 423/22; 536/121; 536/124; 502/24; 502/26
[58] Field of Search .................. 536/121, 124; 423/22; 502/24, 26

[56] References Cited

U.S. PATENT DOCUMENTS 4,413,118 11/1983 Roberts et al. ............. 536/7.1
4,464,515 8/1984 Rempel et al. ............. 525/338

FOREIGN PATENT DOCUMENTS 56-65948 6/1981 Japan .................. 423/22
1558491 1/1980 United Kingdom .

*Primary Examiner*—Ronald W. Griffin
*Assistant Examiner*—Everett White
*Attorney, Agent, or Firm*—Stevens, Davis, Miller & Mosher

[57] ABSTRACT

The present invention provides a method to treat a rhodium containing solution which is derived from the catalytic hydrogenation of nitrile rubber.

An additive selected from thiourea, polysaccharide and carbon black is used to cause a rhodium-containing precipitate. The precipitate is then separated from the solution by, for example, filtration or centrifugation.

7 Claims, No Drawings

METHOD TO TREAT RHODIUM-CONTAINING SOLUTIONS

The present invention provides a method to treat a rhodium containing solution which is derived from the catalytic hydrogenation of nitrile rubber.

An additive selected from thiourea, polysaccharide and carbon black is used to cause a rhodium-containing precipitate. The precipitate is then separated from the solution by for example, filtration or centrifugation.

The present invention relates to a method to treat a rhodium-containing solution obtained from the catalytic hydrogenation of nitrile rubber.

BACKGROUND

Certain rhodium based catalysts are known to be particularly suitable for the selective hydrogenation of the carbon-carbon double bonds in unsaturated acrylonitrile-butadiene rubber.

For example, U.K. No. 1,558,491 teaches the use of chlororhodium tris (triphenylphosphine), $RhCl(PPh_3)_3$, in a process to hydrogenate acrylonitrile-butadiene rubber.

Similarly, U.S. Pat. No. 4,464,515 teaches the use of hydrido rhodium tetrakis (triphenylphosphine) catalyst, $HRh(PPh_3)_4$, in a process to selectively hydrogenate unsaturated acrylonitrile-butadiene rubber.

In both of these known processes, the unsaturated nitrile rubber is dissolved in a suitable solvent to provide a viscous rubber solution. The catalyst is then dissolved in the rubber solution. These hydrogenation processes are said to be homogeneous because the substrate and catalyst are contained in the same phase.

The selectively hydrogenated nitrile rubber which is produced by either of the above homogeneous hydrogenation processes is less susceptible to heat-induced degradation in comparison to unsaturated nitrile rubber. One advantage of the above homogeneous processes is that they are efficient with respect to the minimal amount of catalyst which is required to catalyze hydrogenation of the carbon-carbon double bonds. However, a typical disadvantage of any homogeneous catalytic process is that it is generally quite difficult to remove the catalyst from the system when the reaction is completed (in comparison to a heterogeneous process, where the catalyst is not dissolved and hence may be readily removed by filtration or centrifugation).

For reasons of process economy and product performance purity, it is extremely desirable to remove the rhodium hydrogenation catalyst residue from solutions of partially hydrogenated nitrile rubber. Thus, the object of the present invention is to provide a method to treat a rhodium containing solution obtained from the hydrogenation of nitrile rubber.

The present invention provides a method to treat a rhodium containing solution obtained from the catalytic hydrogenation of nitrile rubber, said method comprising:

(i) adding to said solution an additive selected from:
  (a) thiourea
  (b) polysaccharide, and
  (c) activated carbon, thereby forming a rhodium-containing precipitate which is not soluble in said solution, and
(ii) separating the precipitate from the solution.

DETAILED DESCRIPTION OF THE INVENTION

The unsaturated nitrile rubber which is homogeneously hydrogenated to yield a solution suitable for treatment by the method of the present invention is a copolymer of a $C_{3 \text{ to } 5}\beta,\alpha$ unsaturated nitrile and a $C_{4 \text{ to } 6}$ conjugated diene. A typical example is acrylonitrile butadiene rubber, which is also known as NBR. Unsaturated nitrile rubber may be readily produced by the well known free radical emulsion polymerization process. A typical unsaturated nitrile rubber produced by the copolymerization of acrylonitrile and butadiene contains from 20 to 50 weight per cent bound acrylonitrile units, with the balance being bound butadiene.

It is desirable to selectively hydrogenate nitrile rubber, i.e. to hydrogenate the carbon-carbon double bond unsaturation without reducing the carbon nitrogen triple bond. However, many of the comparatively inexpensive base metal hydrogenation catalysts, such as Raney nickel, cobalt alkyls, and aluminum alkyls are either not sufficiently active for the hydrogenation of nitrile rubber and/or are not selective in that they also catalyze the reduction of carbon-nitrogen triple bond unsaturation.

Certain homogeneous rhodium complexes have been discovered to be particularly active homogeneous catalysts for the selective hydrogenation of nitrile rubber. The selective hydrogenation of nitrile rubber thus provides a partially hydrogenated nitrile rubber. As used herein, the term partially hydrogenated nitrile rubber refers to a polymer in which at least 80% of the original carbon-carbon double bonds contained in an unsaturated nitrile rubber have been hydrogenated.

Chlororhodium tris (triphenylphosphine) and hydrido rhodium tetrakis (triphenylphosphine) are known to be efficient catalysts for the selective hydrogenation of nitrile rubber. Both of these catalysts are expensive, so there is a cost incentive to develop a process for their recovery.

The present invention requires the precipitation of rhodium-bearing complexes from solutions obtained from the catalytic hydrogenation of nitrile rubber. The rhodium-containing precipitates are caused by adding an additive selected from activated carbon, thiourea and polysaccharide. The precipitate is removed from the solution by techniques known to those skilled in the art, such as filtration or centrifugation.

In one embodiment of the present invention, activated carbon is used to produce a rhodium-containing precipitate.

Activated carbon is a well known article of commerce. It is typically prepared by partially burning organic materials such as coconut shells or peat, thus providing fine carbon particles having a large surface area.

Heterogeneous catalysts are sometimes prepared by impregnating activated carbon with a hydrogenation. Thus, activated carbon is used in the present method in a manner which is somewhat similar to methods used to prepare heterogeneous catalysts, except that the activated carbon is used to remove rhodium complexes from solution rather than to prepare a catalyst.

Thiourea, $(NH_2)_2 C=S$, may also be employed in the method of the present invention to cause a rhodium-containing precipitate. While not wishing to be bound by any theories, it is believed that carbon-sulphur double bond of thiourea forms a complex with rhodium metal. The resulting complex is insoluble in the solvent used in the polymer hydrogenation process, thus causing a rhodium-containing precipitate. The amount of thiourea employed is preferably from 5 to 75 parts by weight per 100 parts by weight of partially hydrogenated nitrile rubber. The thiourea may be added neat, or as a solution in a minor amount of a protic solvent (such as methanol, ethanol or water). The thiourea may be added at room temperature and ambient pressure. However, it is preferred to warm the solution to between 40 and 110° C prior to the addition of thiourea.

In a preferred embodiment, the insoluble rhodium-thiourea precipitate is separated from the solution by centrifugation. In a highly preferred embodiment, the rhodium-thiourea precipitate is extracted from the polymer solution with a solvent for the precipitate which is not completely miscible with the polymer solution. In one such preferred embodiment, a rhodium-containing rubber solution of partially hydrogenated nitrile rubber in monochlorobenzene is treated with thiourea to yield a thiourea-rhodium complex which precipitates from the rubber solution. The rubber solution is then contacted with from 50 to 300 parts by weight water per 100 parts solution. Water is a solvent for the precipitate but it is not completely miscible with the monochlorobenzene solution. The rhodium-thiourea complex is extracted from the monochlorobenzene solution into the water.

Thus, the rhodium thiourea complex dissolves in the water to provide an aqueous, rhodium-containing solution. The aqueous solution is not miscible with the monochlorbenzene-rubber solution, so the two solutions may be readily separated, for example, by decanting.

In another embodiment of the present invention, a polysaccharide additive is used to prepare a rhodium-bearing precipitate. The polysaccharide is selected from cereal grain flour and starch. Typical cereal grain flours include rye and wheat flour and typical starches include ungelatinized corn starch and ungelatinized potato starch. The starch may optionally be modified with hydrochloric acid so as to make it water soluble.

The use of a polysaccharide additive is particularly advantageous because polysaccharides are generally inexpensive, light coloured and inert.

Further details of the present invention are illustrated by the following non-limiting examples.

Unless otherwise indicated, all parts and percentages are expressed by weight.

EXAMPLE 1 (COMPARATIVE)

A solution of about 6 grams of partially hydrogenated nitrile rubber in 250 ml of monochlorobenzene containing about 85 ppm Rh (based on the rubber) was placed in a round-bottomed flask equipped with a magnetic stirrer.

A condensor was attached to the flask and the solution was heated to about 110° C., under reflux conditions, for a period of about 6 hours. The flask was then removed from the heat and allowed to cool to about room temperature. The solution was coagulated with an approximately equivalent volume of methanol (about 250 ml). The rubber was recovered, dried under vacuum and analyzed by atomic absorption spectroscopy for rhodium content. The rubber was determined to contain about 82 ppm rhodium, indicating that the rhodium has a strong affinity for the partially hydrogenated nitrile rubber.

EXAMPLE 2

This example illustrates the treatment of a rhodium-containing solution of partially hydrogenated nitrile rubber with a polysaccharide additive.

The polysaccharide additive employed was a soluble starch supplied by Aldrich. Soluble starch is a commercially available material which is typically prepared by treating vegetable starch with hydrochloric acid.

200 ml of a solution containing 6 grams of partially hydrogenated nitrile rubber in monochlorobenzene was used in each experiment. The rubber contained about 85 ppm rhodium.

The rubber solution was placed in a round-bottomed flask equipped with a reflux condensor. The additive, in the amount shown in Table 1, was dissolved in a minor amount (5 to 20 ml) of water. The starch solution was then added to the rubber solution. The resulting mixture was heated at between 110 and 120° C. for a period of between 6 and 7 hours.

The mixture was then cooled to room temperature. A precipitate formed upon cooling and the precipitate was separated by filtration. The rubber was then coagulated with an approximately equivalent volume of methanol, dried under vacuum, and analyzed for rhodium content by atomic absorption. As shown in Table 1, polysaccharide may be used in the process of the present invention to reduce the level of rhodium in partially hydrogenated nitrile rubber.

TABLE 1

| Experiment | Rubber Solution (ml) | Rubber Content (g) | Starch Additive (g) | Rh Content of Treated Rubber (ppm) |
|---|---|---|---|---|
| 20 | 200 | 6 | 10.0 | 5 |
| 21 | 200 | 6 | 2.0 | 17 |
| 22 | 200 | 6 | 2.0 | 24 |

EXAMPLE 3

This example illustrates the treatment of a solution of partially hydrogenated nitrile rubber containing rhodium with a thiourea additive.

Solutions of partially hydrogenated nitrile rubber in monochlorobenzene were added to a round-bottom flask equipped with a reflux condensor, in the amount shown in Table 2. The thiourea additive was dissolved in a minor amount (5 to 15 ml) of either water or methanol, as shown in Table 2. The thiourea was then added to the rubber solution. The resulting mixture was heated at between 110 and 120° C for a period of between 6 and 7 hours. The mixture was then cooled to room temperature and the resulting precipitate was recovered by filtration.

The rubber solution was then coagulated with an approximately equivalent volume of methanol, dried under vacuum, and analyzed for rhodium content.

As shown in Table 2, thiourea may be effectively used in the process of the present invention to reduce the concentration of rhodium in solutions of hydrogenated nitrile rubber.

TABLE 2

| Experiment | Amount Solution (mls) | Rubber Content (g) | Thiourea (g) | Solvent for thiourea | Rh Content of Treated Rubber (ppm) |
|---|---|---|---|---|---|
| 30 | 200 | 6 | 4 | water | 14 |
| 31 | 200 | 6 | 4 | methanol | 6 |

TABLE 2-continued

| Experiment | Amount Solution (mls) | Rubber Content (g) | Thiourea (g) | Solvent for thiourea | Rh Content of Treated Rubber (ppm) |
|---|---|---|---|---|---|
| 32 | 200 | 6 | 4 | methanol | 1 |
| 33 | 200 | 6 | 2 | methanol | 9 |
| 34 | 200 | 6 | 1 | methanol | 8 |

EXAMPLE 4

This example illustrates the use of activated carbon to treat a solution obtained from the catalytic hydrogenation of nitrile rubber.

As shown in Example 1, homogeneous rhodium catalyst residue has a high affinity for nitrile rubber when the nitrile rubber is coagulated from solution with an approximately equivalent volume of methanol. However, our studies have shown that a portion of the rhodium catalyst residue will remain in the liquid phase if a large excess of methanol is used as a coagulant.

In the experiments of this example, a unit volume of a solution containing about 6 weight per cent partially hydrogenated nitrile rubber in monochlorbenzene was coagulated with four volumes of methanol.

The coagulated rubber was separated from the coagulation liquid. The coagulation liquid was set aside and the separated rubber was then added to one further volume of methanol and left to stand for 8 to 10 hours. The rubber was then separated from the methanol. The methanol was then added to the coagulation liquid. The resulting liquid mixture was concentrated by evaporation to about 15% of the original volume.

As control experiments, two samples of the concentrated liquid were analyzed by atomic absorption and found to contain 10.4 and 10.5 ppm rhodium.

75 ml quantities of the above concentrated liquid were transferred to 100 ml bottles into which activated carbon had been added. The type and amount of activated carbon employed in each experiment is shown in Table 3. The bulk density, iodine number and specific surface area of the activated carbon are listed in Table 3 according to information given by the supplier of the activated carbon.

The bottles were capped and then agitated in a laboratory bottle shaker for 48 hours. The bottles were removed from the shaker and the liquid was filtered. The filtered liquid was then analyzed for rhodium content.

Experiment 42 was completed with compressed cylindrical granules of activated carbon having a diameter of about 1.4 mm and a length of about 4 mm. The rhodium content of the treated liquid from this experiment was found to be 9.2 ppm.

Experiments 43 to 46, which illustrate excellent results in comparison to the result of experiment 42, were completed with activated carbon powder.

TABLE 3

| Experiment | Carbon Surface Area ($m^2/g$) | Carbon Iodine Number | Carbon Bulk Density | Amount Carbon (g) | Rh Concentration of Liquid (ppm) |
|---|---|---|---|---|---|
| 40(control) | — | — | — | — | 10.4 |
| 41(control) | — | — | — | — | 10.5 |
| 42 | 850 | n.a. | 500 | 10.9 | 9.2 |
| 43 | 650 | 750 | 490 | 10.6 | 2.7 |
| 44 | 900 | 1050 | 380 | 11.1 | 1.8 |
| 45 | n.a. | 850 | 260 | 10.1 | 1.9 |
| 46 | 800 | n.a. | 410 | 10.8 | 2.3 | n.a. = not available

What is claimed is:

1. A process to treat a rhodium-containing rubber solution obtained from the catalytic hydrogenation of nitrile rubber, said process consisting of:
   (i) adding to said solution an additive selected from thiourea, and polysaccharide,
   thereby forming a rhodium-containing precipitate which is not soluble in said solution, and
   (ii) separating said precipitate from said solution.

2. The process according to claim 1 wherein said polysaccharide additive consists of from 30 to 100 parts by weight of soluble starch per 100 parts by weight of said rubber.

3. The process according to claim 1 wherein said separating of said precipitate from said solution is completed by centrifugation.

4. The process of claim 1 wherein said hydrogenated nitrile rubber solution comprises from 5 to 12 parts by weight of said rubber per 100 parts by weight of monochlorobenzene solvent.

5. The process of claim 4 wherein said additive comprises from 5 to 75 parts by weight thiourea per 100 parts by weight of said rubber.

6. The process of claim 5 wherein said separating of said precipitate is completed by:
   (a) adding from 50 to 300 parts by weight of water per 100 parts by weight of thiourea, thereby dissolving said precipitate into said water to form a water solution, and
   (b) separating said water solution from said solution.

7. The process of claim 6 wherein said separating of said water solution is completed by decanting.

* * * * *